(12) United States Patent
Saito et al.

(10) Patent No.: US 11,379,091 B2
(45) Date of Patent: Jul. 5, 2022

(54) OPERATION SUPPORT DEVICE AND OPERATION SUPPORT METHOD

(71) Applicant: Hitachi, Ltd., Tokyo (JP)

(72) Inventors: Nao Saito, Tokyo (JP); Kenta Kirihara, Tokyo (JP); Masahiro Yatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 421 days.

(21) Appl. No.: 16/606,977

(22) PCT Filed: Apr. 18, 2018

(86) PCT No.: PCT/JP2018/016053
§ 371 (c)(1),
(2) Date: Oct. 21, 2019

(87) PCT Pub. No.: WO2018/198911
PCT Pub. Date: Nov. 1, 2018

(65) Prior Publication Data
US 2021/0103365 A1    Apr. 8, 2021

(30) Foreign Application Priority Data

Apr. 27, 2017  (JP) .............................. JP2017-087946

(51) Int. Cl.
*G06F 3/0482*   (2013.01)
*G06F 3/0484*   (2022.01)
*H02J 13/00*    (2006.01)

(52) U.S. Cl.
CPC .......... *G06F 3/0482* (2013.01); *G06F 3/0484* (2013.01); *H02J 13/00* (2013.01)

(58) Field of Classification Search
CPC ....... G06F 3/0482; G06F 3/0484; H02J 13/00
See application file for complete search history.

(56) References Cited

U.S. PATENT DOCUMENTS 7,326,056 B1 *  2/2008  Foster .................... G09B 19/18
                                                434/107
8,922,560 B2 * 12/2014  Majors ................... G06F 30/20
                                                 703/11

(Continued)

FOREIGN PATENT DOCUMENTS

JP          8-84435 A      3/1996
JP         10-210655 A     8/1998

(Continued)

OTHER PUBLICATIONS

International Search Report (PCT/ISA/210) issued in PCT Application No. PCT/JP2018/016053 dated May 29, 2018 with English translation (four pages).

(Continued)

*Primary Examiner* — Daeho D Song
(74) *Attorney, Agent, or Firm* — Crowell & Moring LLP

(57) ABSTRACT

An operation support device is provided with: a similarity determination unit for determining the similarity between actual measured data and simulated data, said actual measured data being measured in an operation target after performing control on the operation target on the basis of, among a plurality of control candidates managed using a control candidate table, a control candidate corresponding to an event having occurred in the operation target, said simulated data being obtained by a simulation assuming the system state of the operation target after performing control on the operation target on the basis of system data indicating the state of the operation target before performing the control on the operation target; and a control candidate table update unit for updating the control candidate table in accordance with the determination result of the similarity determination unit.

10 Claims, 7 Drawing Sheets

(56) References Cited

U.S. PATENT DOCUMENTS

| | | | |
|---|---|---|---|
| 2009/0076749 A1* | 3/2009 | Nasle | G05B 17/02 718/1 |
| 2011/0282505 A1* | 11/2011 | Tomita | H02J 3/14 700/291 |
| 2012/0001916 A1* | 1/2012 | Majors | G06F 30/20 345/440 |
| 2012/0191439 A1* | 7/2012 | Meagher | G06F 30/20 703/18 |
| 2012/0226691 A1* | 9/2012 | Edwards | G10L 25/51 707/E17.046 |
| 2013/0073344 A1* | 3/2013 | Parent | G06Q 10/04 705/7.39 |
| 2013/0123943 A1* | 5/2013 | Igarashi | G05B 19/02 700/1 |
| 2013/0131877 A1* | 5/2013 | Hirose | H02J 13/00034 700/286 |
| 2013/0253898 A1* | 9/2013 | Meagher | G06N 20/00 703/18 |
| 2014/0156250 A1* | 6/2014 | Sterregaard | G06F 30/20 703/18 |
| 2015/0012254 A1* | 1/2015 | Radibratovic | G05B 17/02 703/2 |
| 2015/0153757 A1* | 6/2015 | Meagher | G06F 30/20 700/291 |
| 2016/0149962 A1* | 5/2016 | Umehara | H04L 65/1046 709/229 |
| 2016/0150023 A1* | 5/2016 | Umehara | H04B 7/14 709/228 |
| 2016/0196769 A1* | 7/2016 | Fletcher | G09B 19/167 434/65 |
| 2016/0246905 A1* | 8/2016 | Radibratovic | G06F 30/20 |
| 2016/0246906 A1* | 8/2016 | Radibratovic | G06F 30/20 |
| 2018/0259989 A1* | 9/2018 | Li | G06F 30/20 |
| 2018/0371873 A1* | 12/2018 | Bhatnagar | G06F 30/20 |

FOREIGN PATENT DOCUMENTS

| | | |
|---|---|---|
| JP | 2012-22634 A | 2/2012 |
| JP | 2015-146679 A | 8/2015 |
| JP | 2015-159644 A | 9/2015 |

OTHER PUBLICATIONS

Japanese-language Written Opinion (PCT/ISA/237) issued in PCT Application No. PCT/JP2018/016053 dated May 29, 2018 (three pages).

* cited by examiner

[FIG. 1]
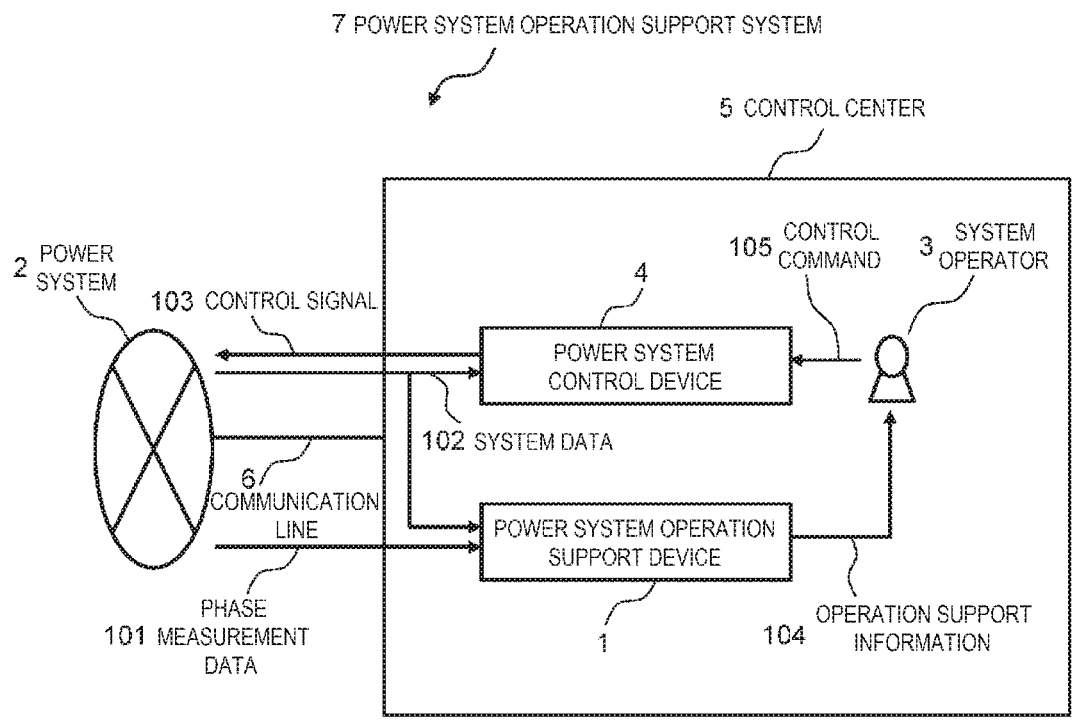

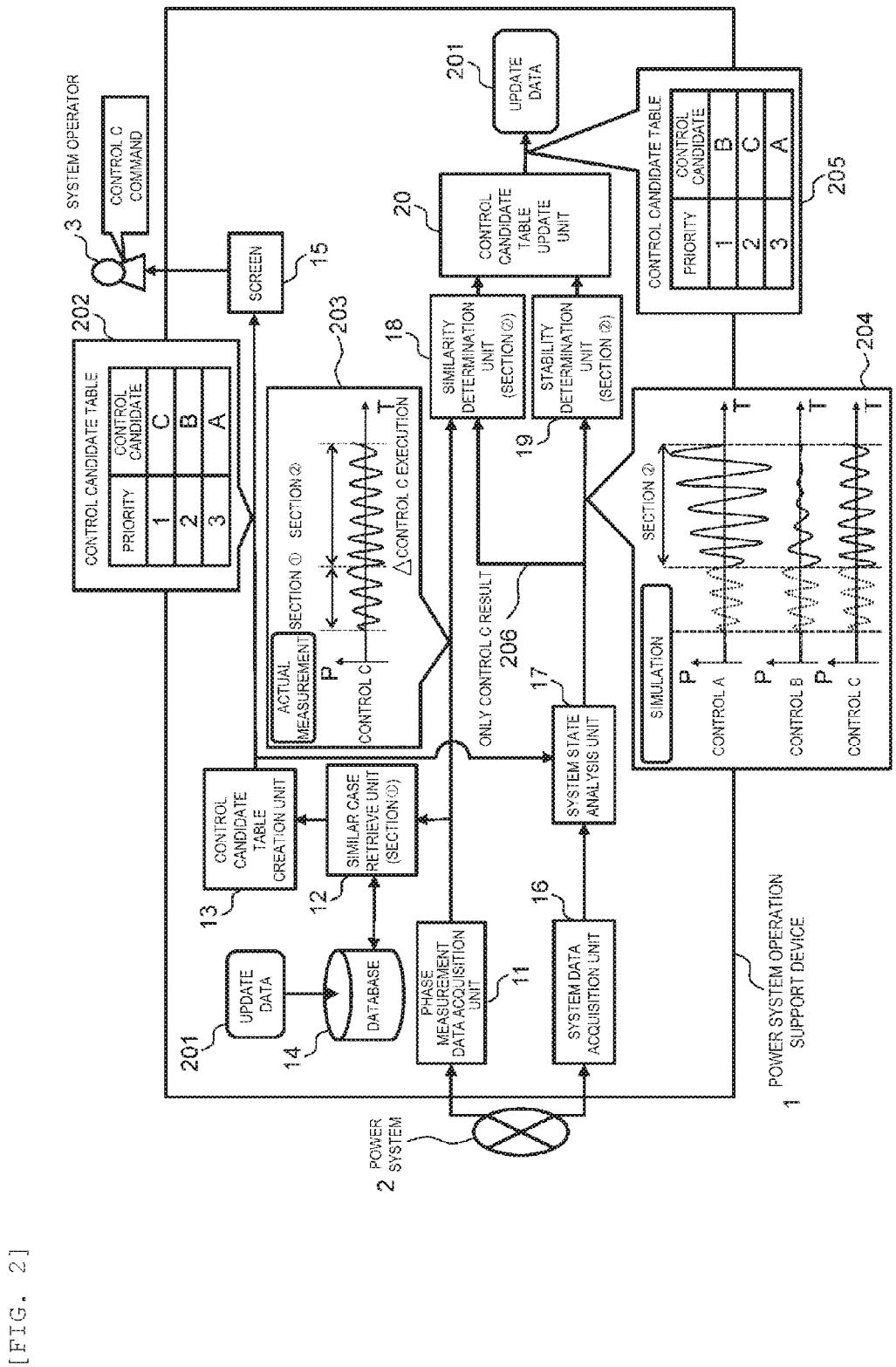
[FIG. 2]

[FIG. 3]
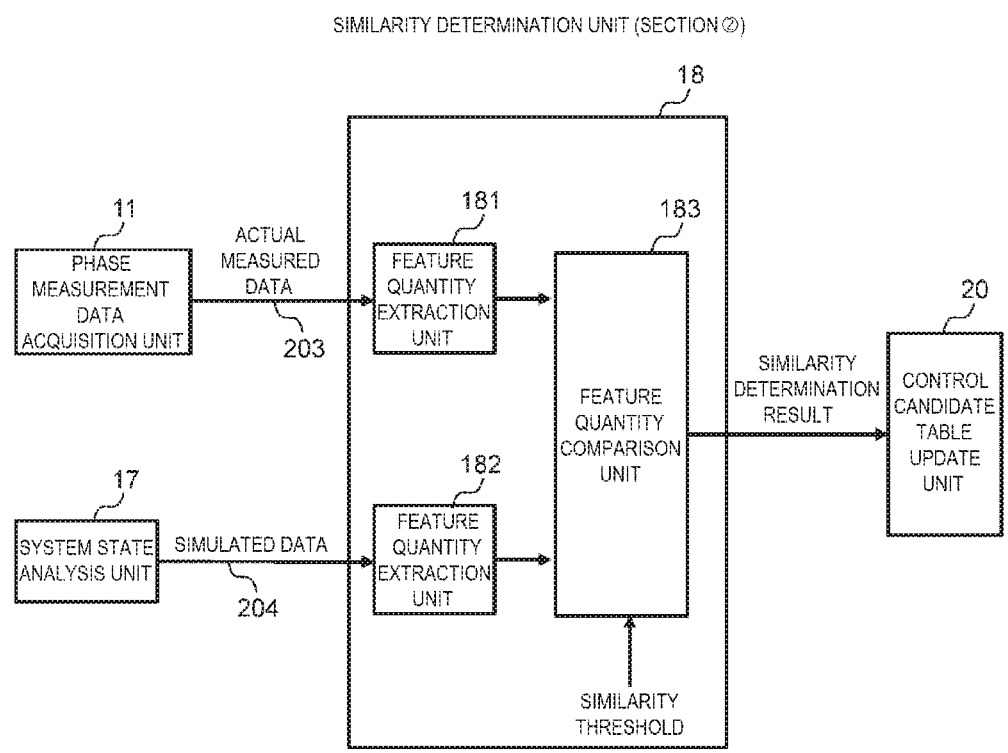

[FIG. 4]
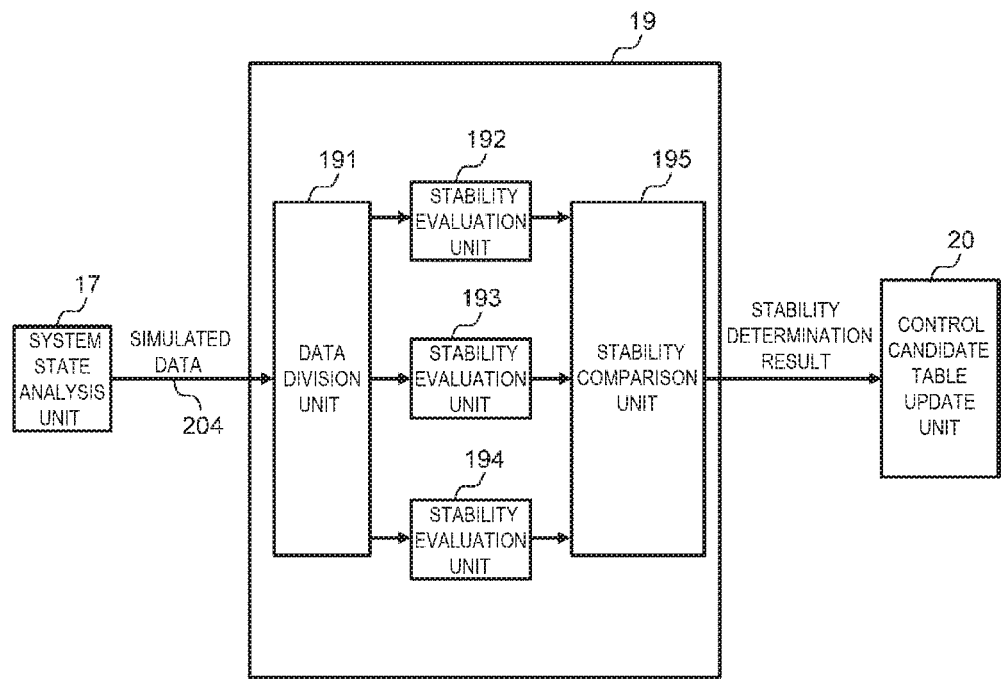

[FIG. 5]
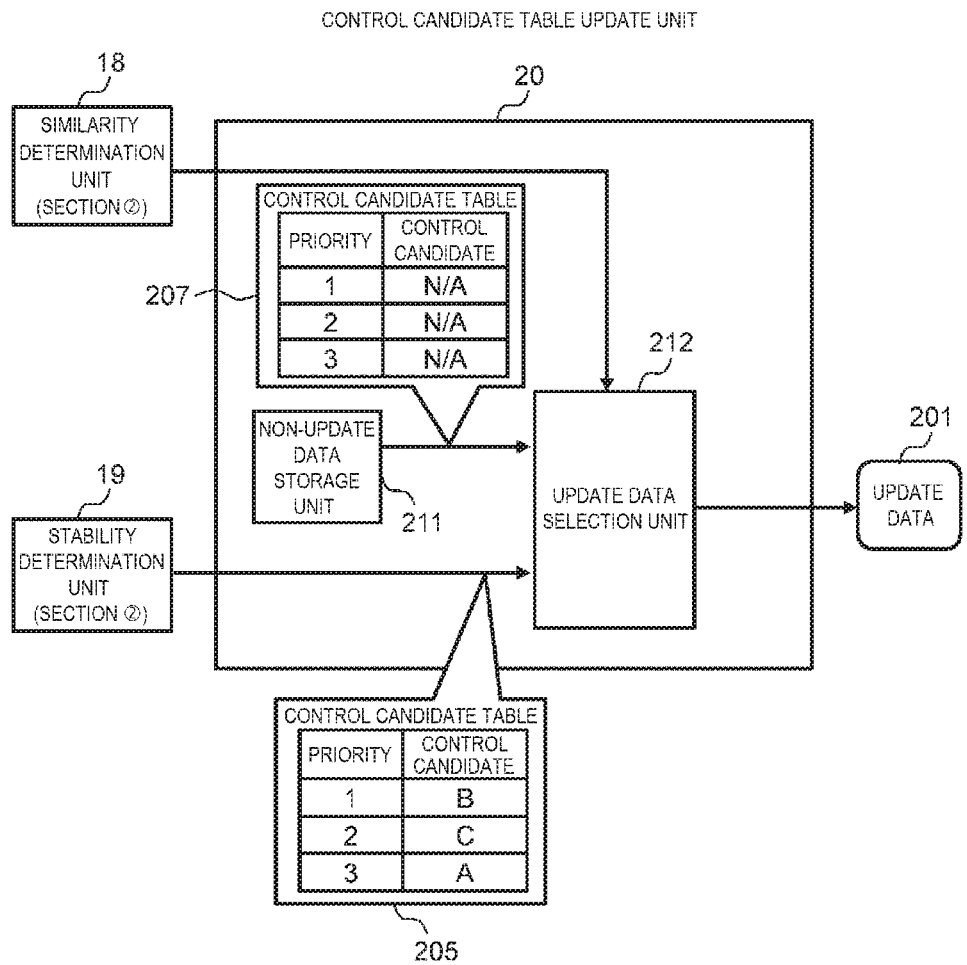

[FIG. 6]
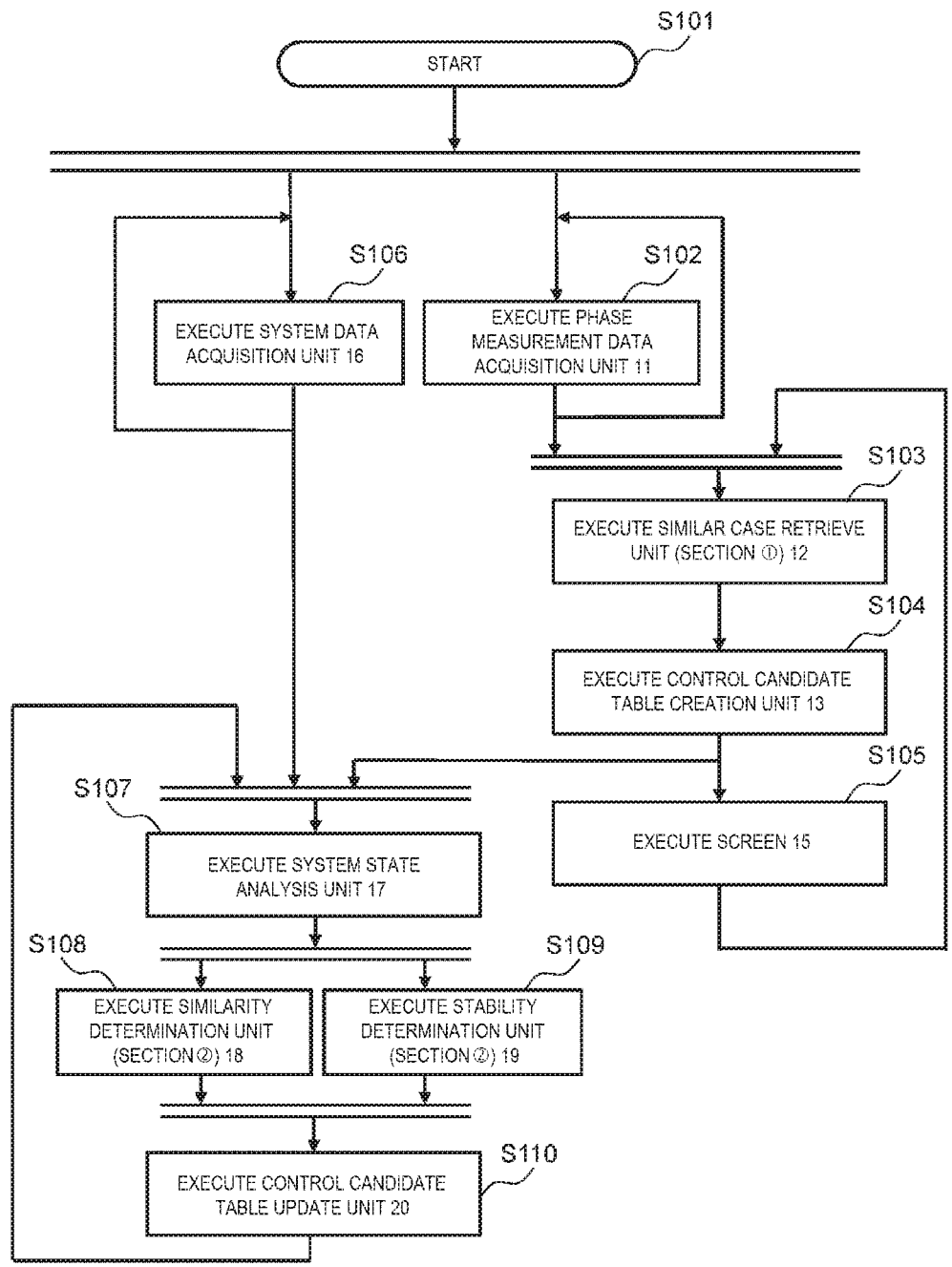

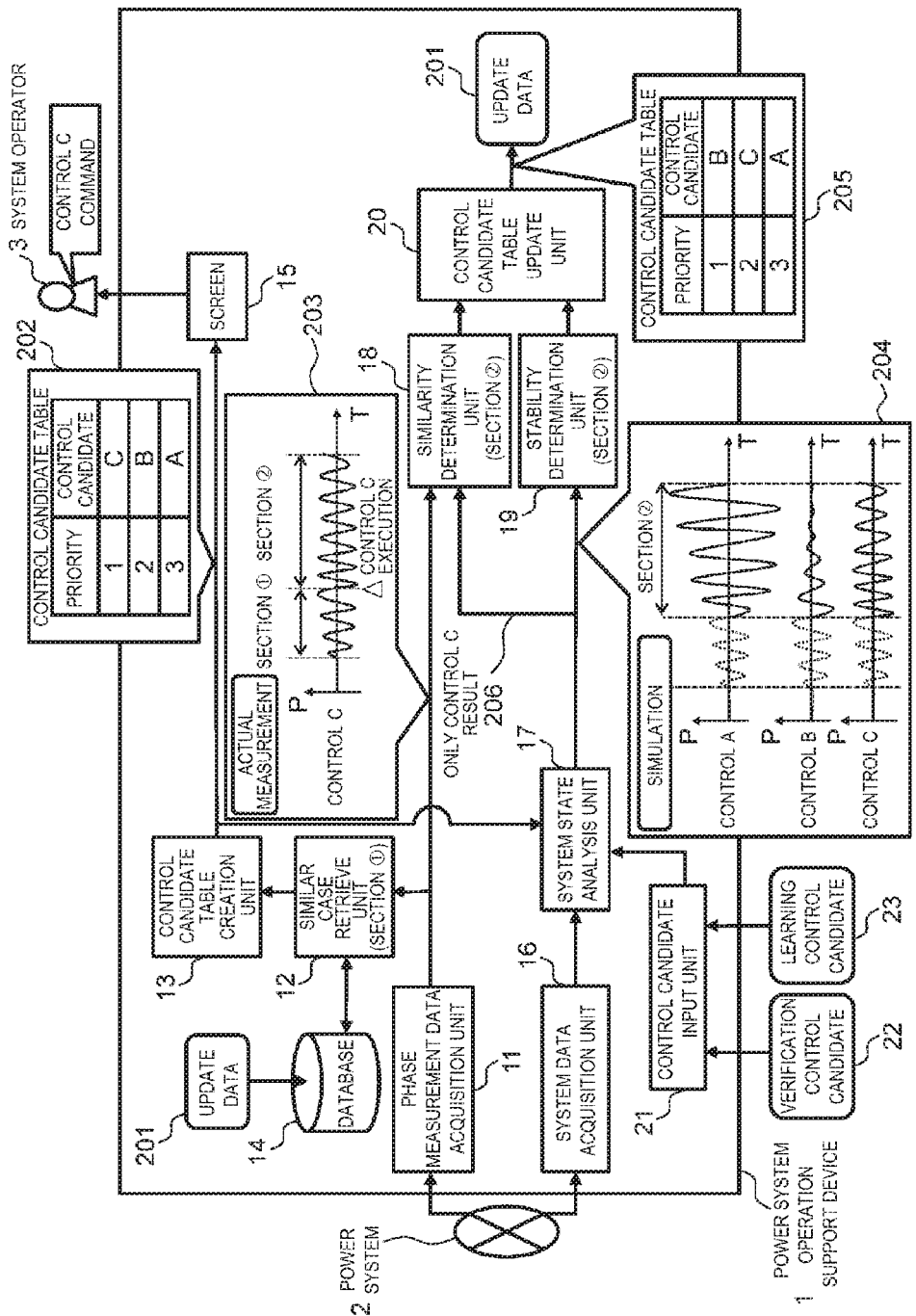
[FIG. 7]

OPERATION SUPPORT DEVICE AND OPERATION SUPPORT METHOD

TECHNICAL FIELD

The present invention relates to an operation support device and an operation support method that support an operation of an operation target.

BACKGROUND ART

In recent years, the use of natural energy, which is represented by solar power generation, wind power generation, and the like, has been increasing in various areas around the world. However, since constant control over output of the natural energy is not easy, the power system is unstable. In addition, accidents occur in a wide area power system due to natural disasters such as typhoon, heavy rain, heavy snow, and tornado, which often lead to power failures.

In various areas around the world, such as North America, a Phasor Measurement Unit (PMU) is introduced as the majority of measurement devices for stabilizing the power system. However, a method of effectively utilizing measurement data collected at a higher frequency than a measurement device such as Supervisory Control and Data Acquisition (SCADA) used in the related art has not yet been sufficiently established.

For example, a power system operator (hereinafter, abbreviated as "operator") has a task to monitor a state such as wide-area fluctuation utilizing the measurement data. In such a task, the importance of the operation of the operator for maintaining monitoring of the state of the power system and the reliability is increasing. In operation of the power system, it has been attempted to store the measurement data in a database as a past case, to retrieve measurement data similar to measurement data of an event occurred in the power system from the database, and to utilize the measurement data.

Here, there is a technique disclosed in PTL 1, which aims to select a control target corresponding to a system phenomenon to prevent insufficient control and to efficiently select the control target, even when a system state suddenly changes and regular control is insufficient. In PTL 1, it is disclosed that "A system sudden change setting unit according to an embodiment generates a system state sudden change model. The stability degree calculation unit obtains a stabilization control amount for the assumed accident. The control target selection unit selects control target information corresponding to the stabilization control amount. For each of the models, the storage unit stores an accident location and an accident modality of the assumed accident, the control target information, and the power flow value before an accident in a control table. The sudden change determination unit retrieves the control table based on accident detection information and determines whether a state of the power system has changed suddenly. The stabilization control unit performs the stabilization control based on the control target information read from the control table corresponding to the system state sudden change model when the state of the power system has changed suddenly."

PRIOR ART LITERATURE

Patent Literature

PTL 1: JP-A-2015-159644

SUMMARY OF INVENTION

Technical Problem

In the operational task of the power system (also referred to as "system operation task"), various operations are performed by the operator, and the efficiency of the system operation task is also different due to a combination of various operations. A candidate of a combination of operations for performing a certain system operation task by the operator is referred to as an "operation candidate". The operator performs the system operation task by operating in accordance with an operation candidate selected from a plurality of operation candidates.

However, since there are many operation candidates, it is difficult for the operator to select an appropriate operation candidate within a few seconds for a system event (hereinafter, abbreviated as "event") occurred in a power system such as a failure or a precursor of failure. For example, even a technique of executing the stabilization control based on the control target information read from the control table corresponding to the system state sudden change model disclosed in PTL 1 is used, the operator cannot appropriately select an operation candidate.

An object of the invention is to select and present an appropriate control candidate from among a plurality of control candidates when an event occurs.

Solution to Problem

An operation support device that reflects an aspect of the invention is an operation support device having a support function of presenting a control candidate table for managing a plurality of control candidates to an operator, and includes a similarity determination unit and a control candidate table update unit.

The similarity determination unit determines a similarity between actual measured data and simulated data, the actual measured data is measured in an operation target after control for the operation target is executed based on, among the plurality of control candidates, a control candidate corresponding to an event occurred to the operation target, and the simulated data is obtained by a simulation assuming a system state of the operation target after the control for the operation target is executed based on system data indicating a state of the operation target before the control for the operation target is executed.

The control candidate table update unit updates the control candidate table in accordance with a determination result of the similarity determination unit.

The operation support device is an aspect of the invention, and a method or the like reflecting an aspect of the invention has a configuration similar to that of the operation support device reflecting an aspect of the invention.

Advantageous Effect

According to the invention, the operator who performs the system operation task can perform an appropriate operation for stabilizing the operation target based on information of the presented control candidate table.

Problems, configurations, and effects other than those described above will be clarified by description of following embodiments.

BRIEF DESCRIPTION OF DRAWINGS

FIG. 1 is a block diagram illustrating a configuration example of a power system operation support system according to an embodiment of the invention.

FIG. 2 is a block diagram illustrating a configuration example of a power system operation support device according to the embodiment of the invention.

FIG. 3 is a block diagram illustrating a configuration example of a similarity determination unit according to the embodiment of the invention.

FIG. 4 is a block diagram illustrating a configuration example of a stability determination unit according to the embodiment of the invention.

FIG. 5 is a block diagram illustrating a configuration example of a control candidate table update unit according to the embodiment of the invention.

FIG. 6 is a flowchart illustrating an example of a processing procedure of the power system operation support device according to the embodiment of the invention.

FIG. 7 is a block diagram showing a configuration example of a power system operation support device according to a second embodiment of the invention.

DESCRIPTION OF EMBODIMENTS

Hereinafter, embodiments of the invention will be described with reference to the accompanying drawings. In the specification and the accompanying drawings, components having substantially the same functions are denoted by the same reference numerals, and repeated description thereof will be omitted.

First Embodiment

<Power System Operation Support System>

FIG. 1 is a block diagram illustrating a configuration example of a power system operation support system 7.

The power system operation support system 7 includes a power system 2, a communication line 6, and a control center 5.

The power system 2 (an example of an operation target) includes, for example, an ultra-high voltage transmission system for 500 kV or the like to a low voltage distribution system for 6 kV or the like, and supplies power, which is transformed by various transformer substations, from a power station to a customer home. The power system 2 is constituted by a plurality of transmission lines, and is constituted by a plurality of topologies such as a mesh system and a radial system. For example, in the North American continent, a power transmission line of a high voltage system is often constituted by a mesh system. On the other hand, in Japan, a power transmission line of a high voltage system is often constituted by a radial system. However, the power system is generally constituted by a combination of various configurations including a mesh system, a radial system, and other configurations.

The communication line 6 connects the power system 2 and the control center 5. The communication line 6 includes not only wired communication by an optical fiber or a coaxial cable but also Power Line Communication (PLC). The communication line 6 may be wireless communication that uses microwaves or the like.

The control center 5 is connected to the power system 2 external thereto via the communication line 6, and monitors the power system 2. The control center 5 is also used as a control station for controlling the power system 2. The control center 5 includes a power system operation support device 1 and a power system control device 4, both of which are operated by a system operator 3.

The power system operation support device 1 acquires phase measurement data 101 and system data 102 from the power system 2 via the communication line 6, and presents operation support information 104 to the system operator 3. Here, the phase measurement data 101 may be, for example, information acquired by a PMU device. The system data 102 may be, for example, information acquired by an SCADA device.

The power system control device 4 acquires the system data 102 from the power system 2 via the communication line 6, and outputs a control signal 103 to the power system 2 via the communication line 6 based on a control command 105 from the system operator 3. Here, the control signal 103 may be a signal autonomously generated by the power system control device 4 regardless of the control command 105 from the system operator 3. The system operator 3 may be constituted by a plurality of system operators.

<Power System Operation Support Device>

Next, a configuration example of the power system operation support device 1 will be described.

FIG. 2 is a block diagram illustrating the configuration example of the power system operation support device 1.

The power system operation support device 1 includes a phase measurement data acquisition unit 11, a similar case retrieve unit (section 1) 12, a control candidate table creation unit 13, a database 14, a screen 15, a system data acquisition unit 16, a system state analysis unit 17, a similarity determination unit (section 2) 18, a stability determination unit (section 2) 19, and a control candidate table update unit 20. The power system operation support device 1 is configured as, for example, a computer device that includes a Central Processing Unit (CPU), an input device, an output device, a communication device, and a storage device (none of which are shown).

The CPU is configured as a central processing unit that performs overall control of operations of the entire device. The input device is constituted by a keyboard or a mouse, and the output device is constituted by a display or a printer. The communication device is constituted by a Network Interface Card (NIC) for connecting to a wireless LAN or a wired LAN. Further, the storage device is constituted by a storage medium such as a Random Access Memory (RAM) and a Read Only Memory (ROM). The phase measurement data acquisition unit 11, the similar case retrieve unit (section 1) 12, the control candidate table creation unit 13, the system data acquisition unit 16, the system state analysis unit 17, the similarity determination unit (section 2) 18, the stability determination unit (section 2) 19, and the control candidate table update unit 20 are stored in the storage device as various computer programs to be executed by the CPU. Information is displayed on the screen 15 of the output device.

The phase measurement data acquisition unit 11 repeatedly executes acquisition of the phase measurement data 101 from the power system 2. The acquired phase measurement data 101 is output to the similar case retrieve unit (section 1) 12 and the similarity determination unit (section 2) 18.

Based on the acquired phase measurement data 101, the similar case retrieve unit (section 1) 12 acquires similar phase measurement data from past phase measurement data stored in the database 14 for a system event. At the same time, a control candidate stored in the database 14 in association with the similar phase measurement data is output to the control candidate table creation unit 13.

Here, a system event refers to that there is a probability of abnormality occurrence in the power system 2 due to various factors, such as meteorological factors including a lightning strike, a strong wind, a heavy rain, a heavy snow, a typhoon, and a tornado, human factors including an operational error of a maintenance operation, and external factors including an aircraft accident. An abnormality case refers to that, for example, a power failure occurs in a costumer home due to reasons represented by a disconnection, a ground fault, and a short circuit or the like; and refers to that, even when a power failure is not caused, an abnormality occurs temporarily in a voltage, a frequency, a power flow, or the like due to a contact between a tree and a power transmission line. In order to grasp the state of the power system 2, the control center 5 constantly measures a voltage, a current, a frequency, active power, reactive power, and the like of the power system 2.

The control candidate table creation unit 13 creates a control candidate table 202 based on information output from the similar case retrieve unit (section 1) 12, and outputs the control candidate table 202 to the screen 15. At the same time, the control candidate table 202 is output to the system state analysis unit 17.

The screen 15 displays the input control candidate table 202 as information belonging to the operation support information 104, and can present the control candidate table 202 to the system operator 3. The system operator 3 can execute the control command with reference to the screen 15. In the present embodiment, it is assumed that control C among control candidates is executed.

As described above, by determining the similarity with the past phase measurement data stored in the database 14, the system operator 3 can execute a more appropriate control command based on past knowledge, and power system operation can be implemented with higher reliability and high economic efficiency in operating the power system 2.

However, for example, when taking the beginning of using the power system operation support device 1 as an example, it is assumed that no sufficient amount of phase measurement data is stored in the database 14. In such a case, even if the information stored in the database 14 is retrieved from the similar case retrieve unit (section 1) 12, an appropriate retrieve result is not always obtained. As a result, it is also assumed that control candidates in the control candidate table 202 created by the control candidate table creation unit 13 are not optimal control candidates to be presented to the system operator 3.

With such a case assumed, update data 201 is input to the database 14 by using a method described below, and thus a more appropriate control candidate table 202 can be created.

The system data acquisition unit 16 repeatedly executes acquisition of the system data 102 from the power system 2. The acquired system data 102 is output to the system state analysis unit 17.

The system state analysis unit 17 uses the system data 102 to create a simulation condition in which a system state and a configuration at a certain time point are simulated. At this time, a method such as a state estimation may be used. With respect to the created simulation condition, a simulation, which assumes a case where a control candidate contained in the control candidate table 202 input from the control candidate table creation unit 13 is executed, is executed a plurality of times. Then, simulated data 204, which is a result of executing the simulation, is output to the stability determination unit (section 2) 19. At the same time, a part of the simulated data 204 (only a control C result 206 in the present embodiment) is output to the similarity determination unit (section 2) 18.

The similarity determination unit (section 2) 18 compares actual measured data (data measured in the power system 2, among the phase measurement data 101) 203 input from the phase measurement data acquisition unit 11 and a part of the simulated data 204 (only the control C result 206 in the present embodiment) input from the system state analysis unit 17 to determine the similarity. At this time, the actual measured data 203 input from the phase measurement data acquisition unit 11 is assumed to be actual measured data 203 acquired by the phase measurement data acquisition unit 11, after the system operator 3 executes a control command (the control C is assumed to be the command in the present embodiment) based on the control candidate table 202. A result determined by the similarity determination unit (section 2) 18 is output to the control candidate table update unit 20. In the present embodiment, it is assumed that the actual measured data 203 (actual measured data 203 in section 2) and an execution result of the control C contained in the simulated data 204 (simulated data 204 in section 2) can be determined to be similar.

The stability determination unit (section 2) 19 evaluates stability of simulation results of a plurality of control candidates contained in the simulated data 204 input from the system state analysis unit 17. Priority of the control candidate is determined based on an evaluation result, and a determination result is output to the control candidate table update unit 20. In the present embodiment, it is determined that control B, which shows that a fluctuating waveform converges in a shorter time, is the most stable, in accordance with the simulation result of each of control A, the control B, and the control C contained in the simulated data 204. It is determined that the control C is next to the control B in stability. Since the control A has a simulation result in which the waveform diverges, it is determined that the waveform is not stable. As a result, since the stability is in an order of the control B, the control C, and the control A, the control B has priority 1, the control C has priority 2, and the control A has priority 3.

The control candidate table update unit 20 determines whether to update the control candidate table based on both the determination result input from the similarity determination unit (section 2) 18 and the determination result input from the stability determination unit (section 2) 19, and outputs the update data 201. The update data 201 is input to the database 14 to update the control candidates stored in the database 14. In this case, for example, information of the control candidate table 202 is updated with information of a control candidate table 205.

By using the above method, a control candidate to be presented to the system operator 3 at the time when a system event occurs can be updated, and at the time when a new system event occurs, the reliability of an operation of operating the power system 2 can be improved by presenting a more appropriate control candidate table 202 to the system operator 3. Further, by using the simulation in combination, a period necessary for collecting the phase measurement data 101 to be stored in the database 14 can be shortened.

<Similarity Determination Unit (Section 2)>

Next, a configuration example of the similarity determination unit (section 2) 18 will be described.

FIG. 3 is a diagram illustrating the configuration example of the similarity determination unit (section 2) 18.

A feature quantity extraction unit 181 extracts a feature quantity of a system event, from the actual measured data 203 input from the phase measurement data acquisition unit 11. The feature quantity may be, for example, a mode frequency or a damping constant of wide-area fluctuation using Prony analysis or the like, or may be a result of waveform regression analysis. An extraction result is output to a feature quantity comparison unit 183.

Another feature quantity extraction unit 182 is similar to the feature quantity extraction unit 181, but extracts a feature quantity of the system event, from the simulated data 204 input from the system state analysis unit 17. An extraction result is output to the feature quantity comparison unit 183.

The feature quantity comparison unit 183 compares an extraction result of the feature quantity extraction unit 181 and an extraction result of the feature quantity extraction unit 182 based on a similarity threshold, and outputs a similarity determination result to the control candidate table update unit 20.

<Stability Determination Unit (Section 2)>

Next, a configuration example of the stability determination unit (section 2) 19 will be described.

FIG. 4 is a diagram illustrating a configuration example of the stability determination unit (section 2) 19.

A data division unit 191 divides the simulation result contained in the simulated data 204 input from the system state analysis unit 17 for each control candidate, and outputs results obtained by dividing to a stability evaluation unit 192, a stability evaluation unit 193, and a stability evaluation unit 194.

The stability evaluation unit 192 evaluates stability of a simulation result corresponding to a certain control candidate, and outputs a stability evaluation result to a stability comparison unit 195. Here, the stability may be, for example, a time until a fluctuating waveform converges.

The stability evaluation unit 193 and the stability evaluation unit 194 may have similar processing content with the stability evaluation unit 192, and output respective stability evaluation results to the stability comparison unit 195.

The stability comparison unit 195 determines priority of the control candidate based on the stability evaluation results of the stability evaluation unit 192, the stability evaluation unit 193, and the stability evaluation unit 194, and outputs a stability determination result to the control candidate table update unit 20.

<Control Candidate Table Update Unit>

Next, a configuration example of the control candidate table update unit 20 will be described.

FIG. 5 is a diagram illustrating the configuration example of the control candidate table update unit 20.

A non-update data storage unit 211 can store data selectable in an update data selection unit 212. In the present embodiment, information indicating that the control candidate is not updated is stored as N/A.

Based on the determination result of the similarity determination unit (section 2) 18, the update data selection unit 212 selects the control candidate table 205 input from the stability determination unit (section 2) 19 in a case of being similar, and selects a control candidate table 207 stored in the non-update data storage unit 211 in a case of not being similar. Then, a selected result is output as the update data 201.

<Processing Procedure of Power System Operation Support Device>

FIG. 6 is a flowchart illustrating an example of a processing procedure of the power system operation support device 1. With the processing procedure in this flowchart, an operation support method by the power system operation support device 1 is implemented.

The following processing is implemented by a CPU executing the various programs stored in the storage device. When the processing starts (S101), the CPU first executes the phase measurement data acquisition unit 11 (S102). After S102 ends, the CPU executes the similar case retrieve unit (section 1) 12 (S103) while repeatedly executing S102. Thereafter, the CPU executes the control candidate table creation unit 13 (S104), and executes the screen 15 (processing for displaying information of the control candidate table 202) (S105). Thereafter, the processing of S103, S104, and S105 is repeatedly executed by the CPU.

Meanwhile, the CPU executes the system data acquisition unit 16 (S106). After S106 ends, the CPU executes the system state analysis unit 17 (S107) while repeatedly executing S106. In S107, it is necessary to input a result of S104. Next, the CPU executes the similarity determination unit (section 2) 18 (S108), and executes the stability determination unit (section 2) 19 (S109). Thereafter, the CPU executes the control table update unit 20 (S110). Thereafter, the processing of S107, S108, S109, and S110 is repeatedly executed by the CPU.

In the power system operation support device 1 according to the embodiment described above, the control candidate table 202 is presented on the screen 15 to the system operator 3 when a system event occurs, and by using the simulation, a more appropriate control candidate table 202 can be presented even with respect to a new system event. As a result, the system operator 3 can acquire an operation candidate having high reliability in a short time with respect to a system event occurred in the current power system 2. Therefore, by more appropriately determining the control operation of the operator, effects can be achieved that the accuracy is improved, and that the reliability and stability of the power system operation is improved.

Second Embodiment

Next, a second configuration example of the power system operation support device 1 will be described.

FIG. 7 is a block diagram illustrating a second configuration example of the power system operation support device 1.

The power system operation support device 1 includes the phase measurement data acquisition unit 11, the similar case retrieve unit (section 1) 12, the control candidate table creation unit 13, the database 14, the screen 15, the system data acquisition unit 16, the system state analysis unit 17, the similarity determination unit (section 2) 18, the stability determination unit (section 2) 19, and the control candidate table update unit 20, similarly with the power system operation support device 1 in the first embodiment. The respective functions may be similar with those in the first embodiment.

Further, the power system operation support device 1 includes a control candidate input unit 21. The control candidate input unit 21 can input a verification control candidate 22 and a learning control candidate 23. Either or both of the verification control candidate 22 and the learning control candidate 23 can be output from the control candidate input unit 21 to the system state analysis unit 17. The system state analysis unit 17 can select one from the input verification control candidate 22 and the learning control candidate 23 as one of control candidates for executing simulation.

The verification control candidate 22, for example, can be used as a standard control candidate for determining similarity in the similarity determination unit (section 2) 18. By using the standard control candidate, effects can be achieved that determination of the similarity can be executed easily or accurately, and that update of the control candidate table 202 can be executed more appropriately.

The learning control candidate 23, for example, can be used as a standard control candidate for determining stability in the stability determination unit (section 2) 19. By using the standard control candidate, effects can be achieved that determination of the stability can be executed easily or accurately, and that the update of the control candidate table 202 can be executed more appropriately.

[Modification]

In the embodiment described above, the power system operation support device 1 supports a system operation task for the power system 2 serving as an operation target. However, by replacing the power system 2 with, for example, a chemical plant or a control system, the power system operation support device 1 can also be used to support the system operation task with the plant, system, and the like serving as the operation target.

The invention is not limited to the embodiments described above, and various other applications and modifications may be made without departing from the scope of the invention as set forth in the claims. For example, the power system operation support device 1 is an embodiment of the invention, and the configuration is not limited by this embodiment, and the effects obtained are not affected.

For example, the processing procedure illustrated in the flowchart of FIG. 6 is merely an example, and embodiments and effects of the invention are not limited by the processing procedure. The invention can also be implemented by a procedure different from this processing procedure.

The embodiments described above have described configurations of the device and the system in detail and specifically for easy understanding of the invention, and are not necessarily limited to those including all the configurations described above. Apart of the configuration of the embodiments described above can be replaced with the configuration of another embodiment, and the configuration of another embodiment can be added to the configuration of one embodiment. Other configurations may be added to, deleted from or replaced with a part of a configuration of each embodiment.

Control lines and information lines shown are considered to be necessary for description, and all the control lines and information lines are not necessarily shown in a product. In practice, it may be considered that almost all the configurations are connected to each other.

REFERENCE SIGN LIST 1 power system operation support device, 2 power system, 3 system operator, 4 power system control device, 5 control center, 6 communication line, 7 power system operation support system, 11 phase measurement data acquisition unit, 12 similar case retrieve unit (section 1), 13 control candidate table creation unit, 14 database, 15 screen, 16 system data acquisition unit, 17 system state analysis unit, 18 similarity determination unit (section 2), 19 stability determination unit (section 2), 20 control candidate table update unit, 21 control candidate input unit, 22 verification control candidate, 23 learning control candidate, 101 phase measurement data, 102 system data, 103 control signal, 104 operation support information, 105 control command, 181 feature quantity extraction unit, 182 feature quantity extraction unit, 183 feature quantity comparison unit, 191 data division unit, 192 stability evaluation unit, 193 stability evaluation unit, 194 stability evaluation unit, 195 stability comparison unit, 201 update data, 202 control candidate table, 203 actual measured data, 204 simulated data, 205 control candidate table, 206 simulated data (only control C result), 207 control candidate table, 211 non-update data storage unit, 212 update data selection unit

The invention claimed is:

1. An operation support device including a support function for presenting a control candidate table for managing a plurality of control candidates to an operator, the operation support device comprising:
a similarity determination unit, implemented by a processor, that determines a similarity between actual measured data and simulated data, the actual measured data being measured in an operation target after control for the operation target is executed based on, among the plurality of control candidates, a control candidate corresponding to an event occurred in the operation target, and the simulated data being obtained by a simulation assuming a system state of the operation target after the control for the operation target is executed based on system data indicating a state of the operation target before the control for the operation target is executed; and
a control candidate table update unit, implemented by a processor, that updates the control candidate table in accordance with a determination result of the similarity determination unit;
wherein the similarity determination unit includes:
a first feature quantity extraction unit, implemented by a processor, that extracts a feature quantity of the event from the actual measured data;
a second feature quantity extraction unit, implemented by a processor, that extracts a feature quantity of the event from the simulated data; and
a feature quantity comparison unit, implemented by a processor, that compares an extraction result of the first feature quantity extraction unit and an extraction result of the second feature quantity extraction unit based on a similarity threshold to determine a similarity between the respective extraction results.

2. The operation support device according to claim 1, further comprising: a control candidate input unit that inputs a control candidate for learning in the simulation, which is a control candidate managed by the control candidate table.

3. The operation support device according claim 1, wherein the operation target is a power system.

4. An operation support device including a support function for presenting a control candidate table for managing a plurality of control candidates to an operator, the operation support device comprising:
a similarity determination unit, implemented by a processor, that determines a similarity between actual measured data and simulated data, the actual measured data being measured in an operation target after control for the operation target is executed based on, among the plurality of control candidates, a control candidate corresponding to an event occurred in the operation target, and the simulated data being obtained by a simulation assuming a system state of the operation target after the control for the operation target is executed based on system data indicating a state of the operation target before the control for the operation target is executed;
a control candidate table update unit, implemented by a processor, that updates the control candidate table in accordance with a determination result of the similarity determination unit:
a system state analysis unit, implemented by a processor, that executes the simulation assuming the system state of the operation target after the control for the operation target is executed based on the system data indicating the state of the operation target before the control for the operation target is executed, and creates an analysis result as the simulated data; and a stability determination unit, implemented by a processor, that determines priority of each control candidate managed by the control candidate table based on the simulated data created by the system state analysis unit, wherein the control candidate table update unit updates the priority of each control candidate managed by the control candidate table in accordance with a determination result of the stability determination unit.

5. The operation support device according to claim 4, wherein the stability determination unit includes: a data division unit that divides a simulation result belonging to the simulated data created by the system state analysis unit, for each control candidate managed by the control candidate table; a plurality of stability evaluation units that evaluate stability of each control candidate based on a simulation result of each control candidate obtained by dividing in the data division unit; and a stability comparison unit that compares respective stability evaluation results of the plurality of stability evaluation units to determine the priority of the respective control candidates.

6. An operation support method having a support function for presenting a control candidate table for managing a plurality of control candidates to an operator, the operation support method comprising:

a similarity determining step of determining a similarity between actual measured data and simulated data, the actual measured data being measured in an operation target after control for the operation target is executed based on, among the plurality of control candidates, a control candidate corresponding to an event occurred in the operation target, and the simulated data being obtained by a simulation assuming a system state of the operation target after the control for the operation target is executed based on system data indicating a state of the operation target before the control for the operation target is executed; and a control candidate table updating step of updating the control candidate table in accordance with a determination result in the similarity determining step;

wherein the similarity determining step includes:

a first feature quantity extracting step of extracting a feature quantity of the event from the actual measured data;

a second feature quantity extracting step of extracting a feature quantity of the event from the simulated data; and a feature quantity comparing step of comparing an extraction result in the first feature quantity extracting step and an extraction result in the second feature quantity extracting step based on a similarity threshold to determine a similarity of the respective extraction results.

7. The operation support method according to claim 6, further comprising: a control candidate inputting step of inputting a control candidate for learning in the simulation, which is a control candidate managed by the control candidate table.

8. The operation support method according claim 6, wherein the operation target is a power system.

9. An operation support method having a support function for presenting a control candidate table for managing a plurality of control candidates to an operator, the operation support method comprising:

a similarity determining step of determining a similarity between actual measured data and simulated data, the actual measured data being measured in an operation target after control for the operation target is executed based on, among the plurality of control candidates, a control candidate corresponding to an event occurred in the operation target, and the simulated data being obtained by a simulation assuming a system state of the operation target after the control for the operation target is executed based on system data indicating a state of the operation target before the control for the operation target is executed;

a control candidate table updating step of updating the control candidate table in accordance with a determination result in the similarity determining step;

a system state analyzing step of executing the simulation assuming the system state of the operation target after the control for the operation target is executed based on the system data indicating the state of the operation target before the control for the operation target is executed, and creating an analysis result as the simulated data; and a stability determining step of determining priority of each control candidate managed by the control candidate table based on the simulated data created in the system state analyzing step, wherein in the control candidate table updating step, the priority of each control candidate managed by the control candidate table is updated in accordance with a determination result in the stability determining step.

10. The operation support method according to claim 9, wherein the stability determining step includes: a data dividing step of dividing a simulation result belonging to the simulated data created in the system state analyzing step, for each control candidate managed by the control candidate table; and a stability evaluating step of evaluating stability of each control candidate based on a simulation result of each control candidate obtained by dividing in the data dividing step; and a stability comparing step of comparing respective stability evaluation results of the stability evaluating step to determine the priority of the respective control candidates.

* * * * *